(No Model.)
G. TRUMP.
Pitcher.
No. 230,724.  Patented Aug. 3, 1880.
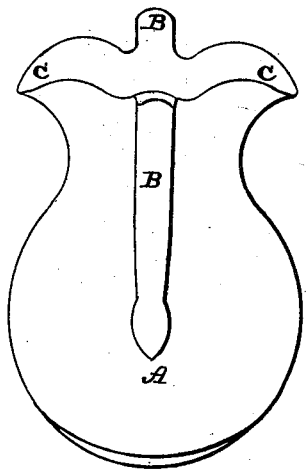
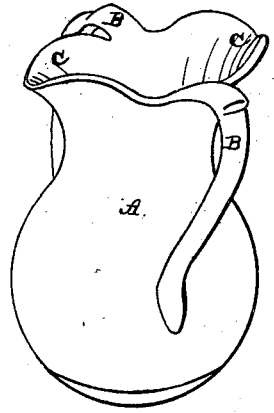
Witnesses:
N. W. Mortimer
Will. H. Kern
Inventor:
Geo. Trump,
per
F. A. Lehmann,
Atty.

UNITED STATES PATENT OFFICE.

GEORGE TRUMP, OF DRIFTWOOD, PENNSYLVANIA, ASSIGNOR OF ONE-HALF OF HIS RIGHT TO C. H. CARSTENS, OF SAME PLACE.

PITCHER.

SPECIFICATION forming part of Letters Patent No. 230,724, dated August 3, 1880.

Application filed March 30, 1880. (No model.)

*To all whom it may concern:*

Be it known that I, GEO. TRUMP, of Driftwood, in the county of Cameron and State of Pennsylvania, have invented certain new and useful Improvements in Pitchers; and I do hereby declare the following to be a full, clear, and exact description of the invention, such as will enable others skilled in the art to which it appertains to make and use it, reference being had to the accompanying drawings, which form part of this specification.

My invention relates to an improvement in pitchers, and especially those of the smaller size, which are designed for holding cream; and it consists in providing the pitcher with two handles and two spouts, the spouts being arranged on opposite sides of the pitcher, between the two handles, as will be more fully described hereinafter.

The object of my invention is to place a handle upon opposite sides of the pitcher, so that when the pitcher is handed from one person to another there will always be a handle on the side next to him to be taken hold of, and thus prevent the trouble of having to turn the pitcher around so as to bring the handle on the side next to the person to whom the pitcher is handed. By thus having the two handles and the two spouts arranged in the relation to each other as described, the pitcher is more readily handled, and is adapted for both right and left handed persons.

Figure 1 is a side elevation of my pitcher, and Fig. 2 is a perspective of the same.

A represents a pitcher of any desired shape, size, or construction, and which has the two handles B arranged upon opposite sides, and the two spouts C arranged opposite each other, and in between the two handles. By thus providing the pitcher with two handles and two spouts, one of the handles is always in a convenient position to be taken hold of by the persons upon either side of the table, and in passing the pitcher from one party to another there is always a handle on the side next to the person to whom the pitcher is handed, and a corresponding spout to this handle, so that the party, whether right or left handed, can pour out the cream or other substance in the pitcher without the trouble of turning the pitcher around.

Another advantage is, that there being two handles, the pitcher is readily transferred from one hand to the other without the trouble of turning the pitcher around to get at the handle, and thus running the risk of dropping it.

Having thus described my invention, I claim—

As a new article of manufacture, a pitcher provided with two handles and two spouts, the handles being arranged on opposite sides of the pitcher and the spouts being arranged opposite to each other and in between the handles, substantially as shown and described.

In testimony that I claim the foregoing I have hereunto set my hand this 26th day of March, 1880.

GEORGE TRUMP.

Witnesses:
J. B. EARL,
H. E. COLEMAN.